Sept. 2, 1941.                P. HEFTLER                2,254,287
NON-REARING-UP AUTOMOBILE SPRING SUSPENSION
Filed Aug. 18, 1939

Paul Heftler

Patented Sept. 2, 1941

2,254,287

UNITED STATES PATENT OFFICE 2,254,287

NON-REARING-UP AUTOMOBILE SPRING SUSPENSION

Paul Heftler, Chicago, Ill.

Application August 18, 1939, Serial No. 290,851

4 Claims. (Cl. 280—124)

What the invention is about

One fault of present day cars is that, when their brakes are applied, they nose-dive at the front and rear-up at the back. That is why, when two cars are being stopped and one runs into the back of the other, their bumpers miss each other and one bumper smashes the front fenders and grille of one car, and the other bumper smashes the tail end of the body of the other car.

When this invention is used on a car, there is no rearing-up when the brakes are applied. (This invention, when used only at the back of a car, does not cure nose-diving, but there are front suspensions that will cure that.) This invention is a change in the common semi-elliptic rear spring suspension or Hotchkiss drive, and it consists only in making the parts of the springs in front of the rear axle a certain amount shorter than the parts in back. The right proportions of the springs for any car depend on the height of its center of gravity, its wheelbase, and the strength of its rear brakes as compared to its front brakes, and what these proportions are is explained below.

The drawing

Where the invention is used

This invention can be used on any car that has semi-elliptic springs at the rear and in which the springs are what keeps the axle from twisting around when the brakes are applied. Thus, every car with a Hotchkiss drive can use the invention. It cannot be used where there is a torque arm or a torque tube.

Figure 2:
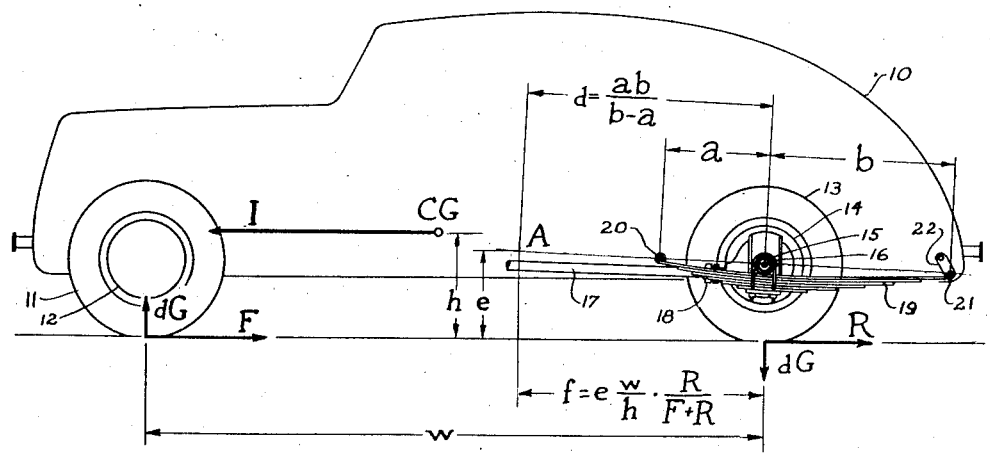
Figure 2 is a diagram that shows the right proportions for the rear springs and also the forces that act on a car when the brakes are applied.

The invention is shown in Figure 2 as applied to a car 10 having the usual front wheels 11 and brakes 12 and the usual rear wheels 13 and brakes 14, the rear wheels and brakes being carried by a rear axle 15. The rear axle has axle shafts 16 for driving the rear wheels and contains the usual gears for taking the power from the propeller shaft 17 and applying it to the axle shafts 16 and the rear wheels 12. The propeller shaft is connected to the rear axle through a universal joint 18 and is connected to the gear box carried on the frame through another universal joint and a slip joint.

The rear axle is held in position by being fixed to semi-elliptic springs 19 whose front eyes 20 are pivoted to the frame of the car and whose rear eyes 21 are connected to the frame by shackles 22. The springs take the torque of the axle both when power is being applied to the wheels and when the brakes go on, so the arrangement is, so far, just the common semi-elliptic spring suspension or Hotchkiss drive.

What the invention is

The invention lies in making the length $a$ of the part of each spring in front of the axle shorter than the length $b$ of the part in back of the axle. These two lengths $a$ and $b$ are made so that a point A, which lies on a straight line 24 through the front and rear spring eyes and whose distance from the axle is equal to the product of these lengths $a$ and $b$ divided by their difference, also lies ahead of the axle a distance $f$ which is approximately equal to the height $e$ of the point A above the ground multiplied by the ratio of the wheelbase $w$ of the car to the height $h$ of the center of gravity CG of the car above the ground and also multiplied by the fraction $$\frac{R}{F+R}$$

of the total braking force that is applied at the rear wheels whenever the brakes are put on.

Put in the form of equations, the location of the point A and the lengths of the parts of the springs are as follows:

$$\frac{f}{e} = \frac{w}{h} \frac{R}{F+R}$$

$$d = \frac{ab}{b-a}$$

in which $f$ is how far the point A is ahead of the axle, $e$ is the height of the point A above the ground, $w$ is the wheelbase of the car, $h$ is the height of the center of gravity of the car above the ground, $$\frac{R}{F+R}$$

is the fraction of the total braking force that is applied at the rear wheels.

$d$ is the distance between the point A and the axle, $a$ is the length of the parts of the springs in front of the axle, and $b$ is the length of the parts of the springs in back of the axle.

Figure 3:
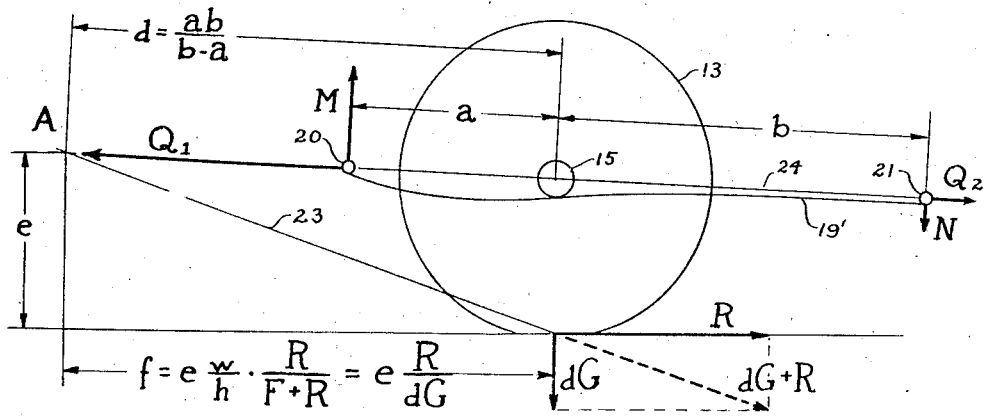
Figures 3 and 4 are diagrams that illustrate the proof given below that the invention works.

These proportions may not seem simple, but they are easy to lay out by first drawing a line 23 (as shown in Figure 3) through a spot on the ground right under the place where the spring is to be fastened to the axle and at an angle to the horizontal whose tangent is $$\frac{w}{h} \cdot \frac{R}{F+R}$$

The point A can be anywhere along this line and will lie where the line crosses a line 24 on which the spring eyes are to be put. This fixes the distance $d$. The point for the rear spring eye can then be picked, which fixed the length $b$, and the length $a$ can be figured out from the equation $$d = \frac{ab}{b-a}$$

to find the place for the front spring eye.

If the spring is to be as long as the spring in the usual Hotchkiss drive, the rear spring eye will have to be moved back a bit from its usual position, but the frames and bodies of most of the cars now made stick out so far behind the rear axle that the rear spring eye will still come under them, and practically no change in the frame will be needed. Figure 2, which is laid out to scale for a car having a 131 inch wheelbase, a 22 inch high center of gravity, and about 54 per cent of the braking effort on the front wheels, shows how the invention fits a typical car of today.

The rules given above do not have to be followed exactly unless nearly perfect results are wanted. Besides, these rules are perfect only for an ideal car. They do not take into account such things as the flywheel effect of the wheels, the fact that some of the weight is unsprung, and that parts of the springs where they are clamped to the axle are dead. To get perfect results, a little cutting and trying must be done, but these rules show the way. On some cars, the springs that would give perfect results would stick out in the rear, but springs can be used that are not quite so long in back, and the result, while not perfect, will be much better than with the springs used now.

Other advantages

Besides cutting out all of the rearing-up when the brakes are applied, the change in the proportions of the Hotchkiss drive described above will cut out the squatting in the rear that now takes place when a car starts. This squatting at the rear would not be so bad if the front did not rise up at the same time, but the two things together make the car tip up like a speed boat if it is starting fast. However, if the rear springs are laid out by the rules given above, the rear of the car will rise up like the front, instead of squatting, and the car will stay level instead of tipping up.

This change in the rear springs will not cure the nose-diving that takes place when the brakes are put on, because it does not prevent the throwing forward of the weight of the car more onto the front springs. It will lessen the nose-diving a little, however, because the tipping forward of the car adds to the nose-diving and this change in the rear springs cuts out half of the tipping forwards.

Of course, the invention can be used at the front of a car, with the long ends of the springs in front, and it will then cut out all the nose-diving, but there is not room for it in front in an ordinary car, and it is not good practice to hold a front axle in place just by springs. It is better to use a kind of knee action that will completely cure nose diving. When this is done, the front and rear suspensions work together and make the car stop absolutely level without any nose-diving or rearing-up. Several knee actions and other front suspensions of this type are described in the patent applications of Gaylord W. Newton and Paul Heftler, Serial Nos. 148,552, 160,712, and 220,369.

The proof that it works

The most important thing about this invention and the one that engineers find hardest to believe is that such a simple change will do the work. Some engineers say that it is impossible, so here is a short proof that it works.

When the brakes of the car shown in Figure 2 are applied, they cause frictional forces F and R where the front and rear wheels touch the ground, and these forces act straight back and stop the car. At the same time, the weight or inertia I of the car, which prevents the car from stopping instantly and which is equal to F and R added together, acts forward at the center of gravity CG of the car. Since the center of gravity CG is a distance $h$ above the ground, the forces F, R and I are out of line and form a couple which throws some of the weight of the car from the rear wheels onto the front wheels. To counteract this, the upward pressure or reaction of the ground on the front wheels increases by an amount $dG$ and on the rear wheels decreases by an amount $dG$. The increase $dG$ at the front and the decrease $dG$ at the rear must be equal, for there has been no change in the weight of the car carried by the road. The couple formed by the two forces $dG$ acting at the ends of the wheelbase $w$ must be equal to the couple formed by the forces F, R and I, for they balance each other. Putting this into an equation gives:

$$dGw = (F+R)h$$

Hence $$F+R = dG\frac{w}{h}$$

The value just found for $F+R$ is put in place of $F+R$ in the equation by which the distance $f$ was defined. This shows that:

$$f = e\frac{R}{dG}$$

This is shown in Figure 3, which also shows all of the outside forces that come into action on the rear wheel, axle and spring assembly when the brakes are put on. The forces $Q_1$ and $Q_2$ are the unknown forces acting in line with the point A, and the forces M and N are the unknown forces acting at right angles to $Q_1$ and $Q_2$ on the front and rear spring eyes. Since any force or forces acting in a plane at one point can be represented by two forces in that plane in any chosen pair of directions at right angles to each other, and since the spring eyes are the only places for any unknown forces to act, the forces $Q_1$, $Q_2$, M and N can represent all of the unknown forces.

Since forces are always in balance when the force of inertia is included, the forces shown in Figure 3, which include the force of inertia, must be in balance. Since they are in balance, their moments about any point, such as the point A, must also be in balance. Putting this into an equation for the moments about the point A gives:

$$Q_1 0 + M(d-a) + Q_2 0 - N(d+b) + Re - dGf = 0$$

Dropping the terms equal to zero and putting in place of $f$ and $d$ the value of $f$ found above and the value given to $d$ in the beginning, gives:

$$M\left(\frac{ab}{b-a}-a\right) - N\left(\frac{ab}{b-a}+b\right) + Re - dGe\frac{R}{dG} = 0$$

$$M\left(\frac{ab-ab+a^2}{b-a}\right) - N\left(\frac{ab+b^2-ab}{b-a}\right) + Re - Re = 0$$

$$Ma^2 - Nb^2 = 0$$

$$M = N\frac{b^2}{a^2}$$

Since $Q_1$ and $Q_2$ are in line with the spring 19, the forces M and N are the only ones that have any appreciable effect on how the spring bends when the brakes are put on. The only thing that has to be proved now is that adding these forces M and N to the forces normally acting on the spring will not cause the spring to lift the car.

Figure 4:
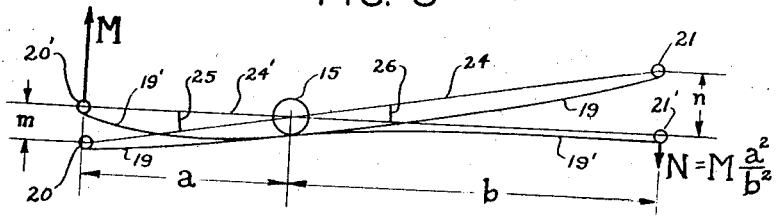

In Figure 4, the line 19' shows the curve of the spring when it is bent by the forces M and N, and the line 19 shows its curve before the forces M and N bend it, the two curves being shown with the axle 15 and the part of the spring 19 or 19' fixed to the axle in the same position. The part of the spring at each side of the axle is a cantilever leaf spring, and the distance which it bends under any load is given by the following formula from Kent's Mechanical Engineers' Handbook, 10th edition, page 1552.

$$Y = 6PL^3/EJBD^3$$

in which

Y is the distance that the end of the spring bends,
P is the load on the end of the spring,
L is the length of the spring from its fixed part to where the load is applied,
E is the stiffness factor or Young's modulus of the material of the spring,
J is the number of leaves in the spring,
B is the width of the spring leaves, and
D is the thickness of the spring leaves.

The above formula applies to both sides of the spring even though the force M is up and would appear at first glance to separate the spring leaves, for M is only the change in load on one end, and the total load on that end still acts down, and hence the spring leaves all act together.

Applying this formula to the spring, we find that the distances $m$ and $n$ which the two ends of the spring are bent by the two forces M and N are as follows:

$$m = \frac{6Ma^3}{EJBD^3}$$

$$n = \frac{6Nb^3}{EJBD^3}$$

Exactly what these distances $m$ and $n$ are does not matter in this proof; it is their ratio that is important. This is $$\frac{m}{n} = \frac{6Ma^3}{EJBD^3} \cdot \frac{EJBD^3}{6Nb^3}$$

or $$\frac{m}{n} = \frac{a^3 M}{b^3 N}$$

Since $$N = M\frac{a^2}{b^2}$$

$$\frac{m}{n} = \frac{a^3 M}{b^3 M\frac{a^2}{b^2}}$$

$$\frac{m}{n} = \frac{a}{b}$$

From this last equation, it is obvious that the angle 25 through which the front spring eye 20 is swung relative to the axle 15 by the force M is the same as the angle 26 through which the rear spring eye 21 is swung by the force N. Hence, a line 24' drawn from the front spring eye to the axle and then to the rear spring eye after the spring is bent by the forces M and N will be just the same as a line 24 drawn in the same way before the spring is bent by these forces. This means that, when the brakes are put on and cause these forces to act on to the springs, the axle will only twist with respect to the ends of the springs and will not move up or down with respect to them or to the frame of the car. Since the axle does not move up or down with respect to the frame, the frame does not move up or down with respect to the axle, and there is no rearing up of the car. That is all that has to be proved.

Although the invention has been described as applied to the rear of an automobile, it can be used in the front and on other types of land vehicles, such as railcars, and I claim as my invention anything that falls within any one of the following definitions:

1. In a land vehicle, the axle spaced longitudinally from the center of gravity of the vehicle, wheels rotatable on the axle and adapted to roll on the ground, means to cause a torque to act between said wheels and said axle, leaf springs extending transversely to said axle and fixed thereto intermediate their ends, and a sprung portion of said vehicle supported in part by the ends of said springs, the portions of the springs between the axle and the center of gravity of the vehicle being shorter than the portions on the other side of the axle, the lengths of the two portions being such that the application of said torque will affect the velocity of said vehicle without affecting the orientation of the sprung portion thereof.

2. In a land vehicle, an axle spaced longitudinally from the center of gravity of the vehicle, wheels rotatable on the axle and adapted to roll on the ground, means to cause a torque to act between said wheels and said axle, leaf springs extending transversely to said axle and fixed thereto intermediate their ends, and a sprung portion of the vehicle supported in part by said ends of said springs, the portions of the springs between the axle and the center of gravity of the vehicle being shorter than the portions on the other side of the axle, and said springs being the sole means for transmitting torque about the axis of the axle from the axle to the sprung portion of the vehicle, the lengths of the two portions of the springs being such that the application of said torque will affect the velocity of said vehicle without substantially affecting the orientation of the sprung portion thereof.

3. In a vehicle having an axle spaced longitudinally of the vehicle from the center of gravity of the vehicle, longitudinally extending leaf springs rigidly secured between their ends to the axle and pivotally secured at their ends to the main portion of the vehicle, said springs being the principal means for transmitting torque between the axle and the main portion of the vehicle, wheels on the axle, and means for transmitting a torque between the wheels and the axle, the improvement which consists in proportioning the springs substantially according to the equations $$d = \frac{ab}{b-a}$$

and $$f = e\frac{w}{h} \cdot \frac{R}{F+R}$$

4. A Hotchkiss drive in which the springs are proportioned substantially according to the equations $$d = \frac{ab}{b-a}$$

and $$f = e\frac{w}{h} \cdot \frac{R}{F+R}$$

the letters in the equations having the meanings defined in the specification.

PAUL HEFTLER.

CERTIFICATE OF CORRECTION.

Patent No. 2,254,287. September 2, 1941.

PAUL HEFTLER.

Figure 1:
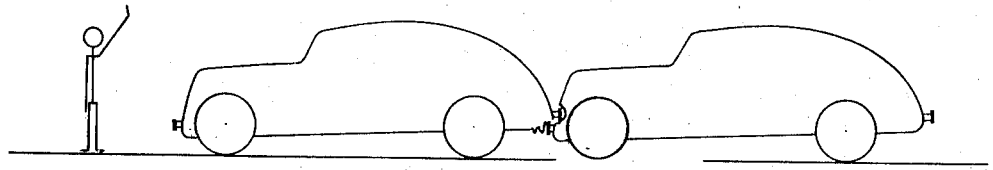
Figure 1 is a sketch that shows what happens when two ordinary cars, particularly cars with knee action in front and semi-elliptic springs in back, come to a sudden stop one after another.

It is hereby certified that error appears in the above numbered patent requiring correction as follows: In the drawing, Figure 1, the horizontal line representing the ground should be unbroken; page 1, second column, line 53, after the word "wheels" strike out the period and insert instead a comma; page 3, second column, line 22, for "on to the" read --on the--; and line 37, claim 1, for "the axle" read --an axle--; page 4, first column, line 15, claim 3, after the equation insert -- the letters in the equations having the meanings defined in the specification.--; and that the said Letters Patent should be read with this correction therein that the same may conform to the record of the case in the Patent Office.

Signed and sealed this 13th day of January, A. D. 1942.

(Seal)

Henry Van Arsdale,
Acting Commissioner of Patents.